United States Patent [19]

Nerem et al.

[11] 4,116,457

[45] Sep. 26, 1978

[54] STEP ASSEMBLY FOR VEHICLE

[76] Inventors: Marvin E. Nerem, 136 E. M St., Forest City, Iowa 50436; Roger W. Denney, 1035 Allen, Garner, Iowa 50438

[21] Appl. No.: 829,235

[22] Filed: Aug. 31, 1977

[51] Int. Cl.² .............................................. B60R 3/02
[52] U.S. Cl. .................................................... 280/166
[58] Field of Search ............... 280/166, 164 R, 164 A; 182/19, 91, 96, 95

[56] References Cited

U.S. PATENT DOCUMENTS

| | | | |
|---|---|---|---|
| 2,118,557 | 5/1938 | Hamilton | 280/166 |
| 3,887,217 | 6/1975 | Thomas | 280/166 |
| 4,020,920 | 5/1977 | Abbott | 280/166 |

*Primary Examiner*—Robert R. Song

*Attorney, Agent, or Firm*—Burd, Braddock & Bartz

[57] ABSTRACT

A power operated step assembly providing an auxiliary step adjacent the doorway of a vehicle. A box frame is secured to vehicle support structure below a doorway open to the interior of the vehicle. A step unit is movably connected to the box frame with two pair of parallel links. A transverse rod mounted on the frame is secured to one link of each pair of links so that the links are rotated in response to rotation of the rod. A power unit comprising a reversible electric motor and a lead screw carrying a nut is attached to the frame and crank arms connected to the rod. A step unit having a transverse platform pivoted to the lower ends of the links is selectively moved to an out step position and an in upper storage position in response to operation of the reversible electric motor.

29 Claims, 9 Drawing Figures

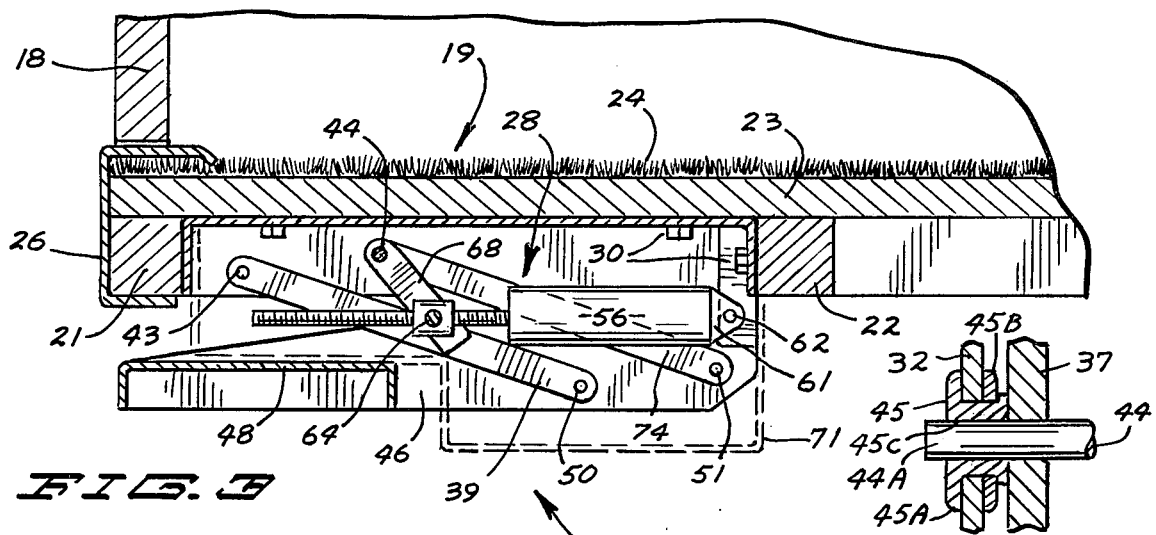
FIG. 3
FIG. 5
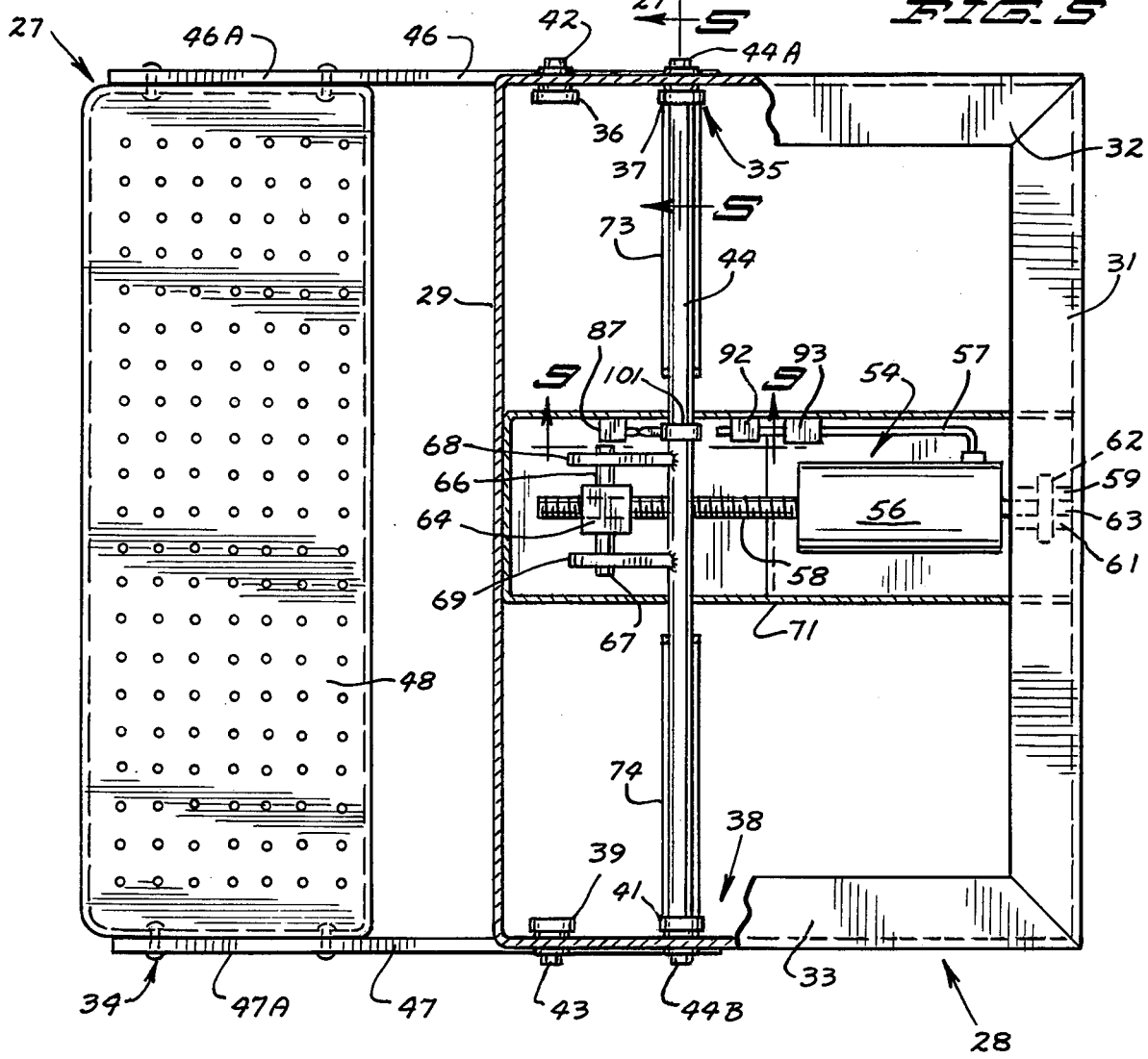
FIG. 4

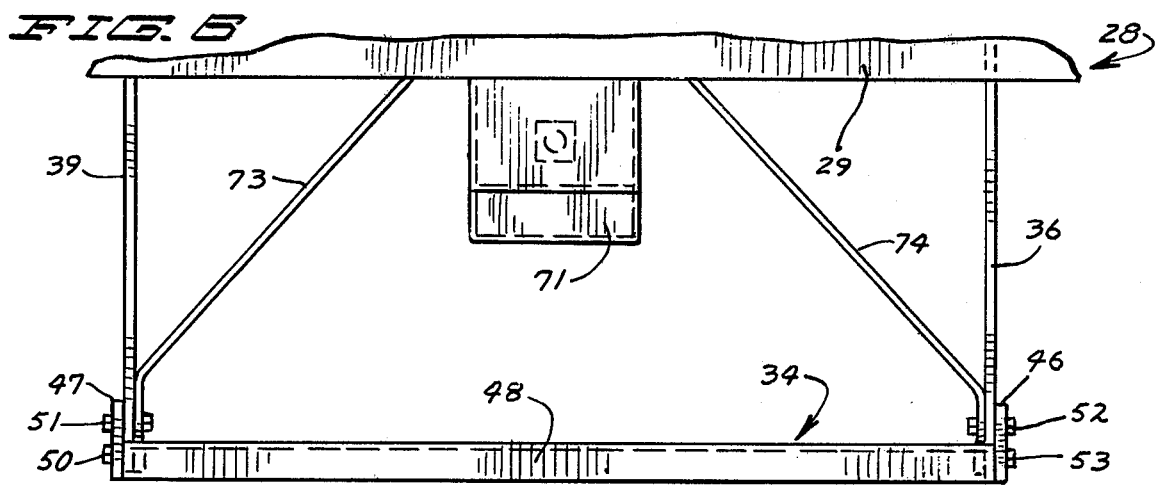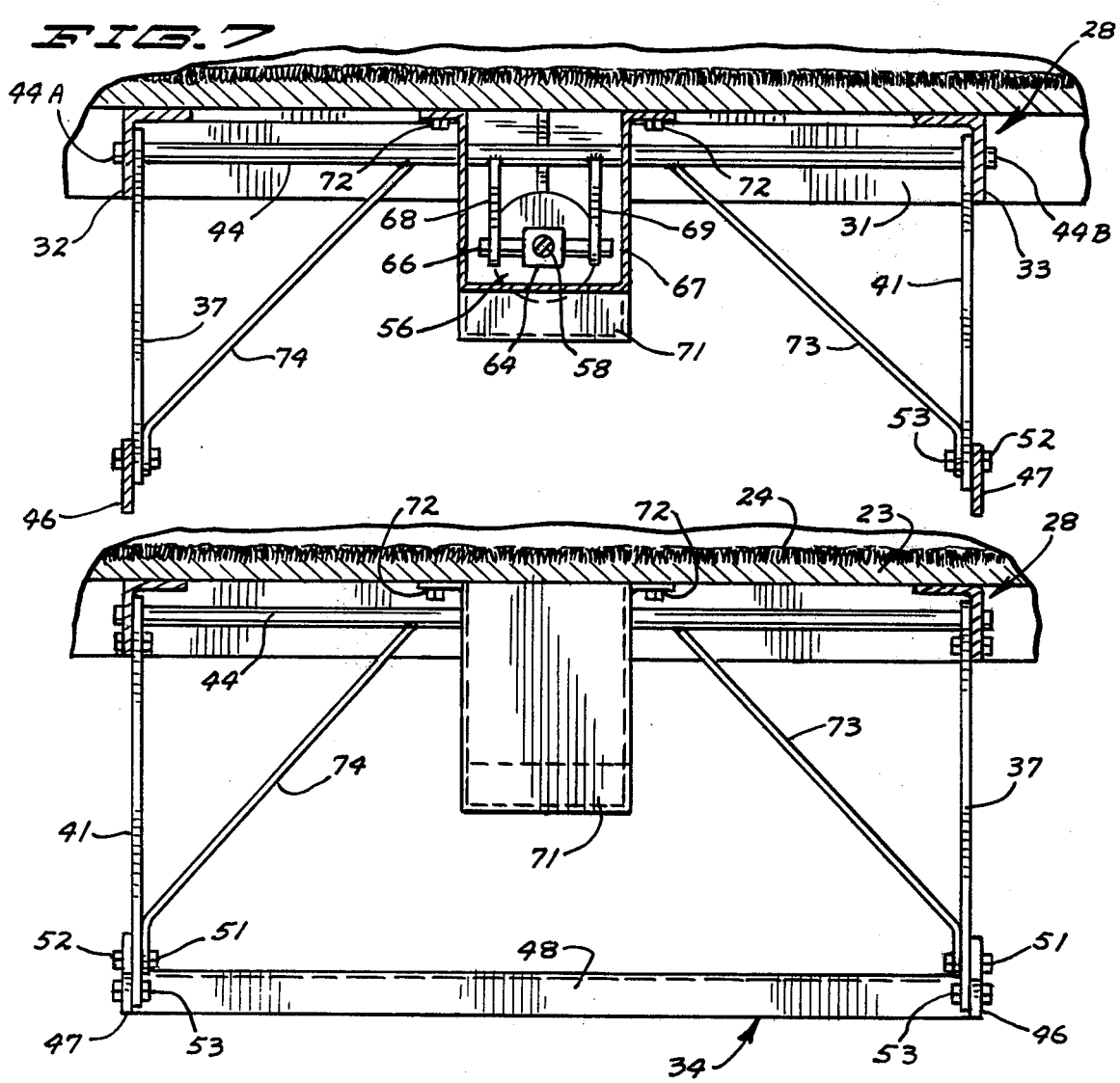

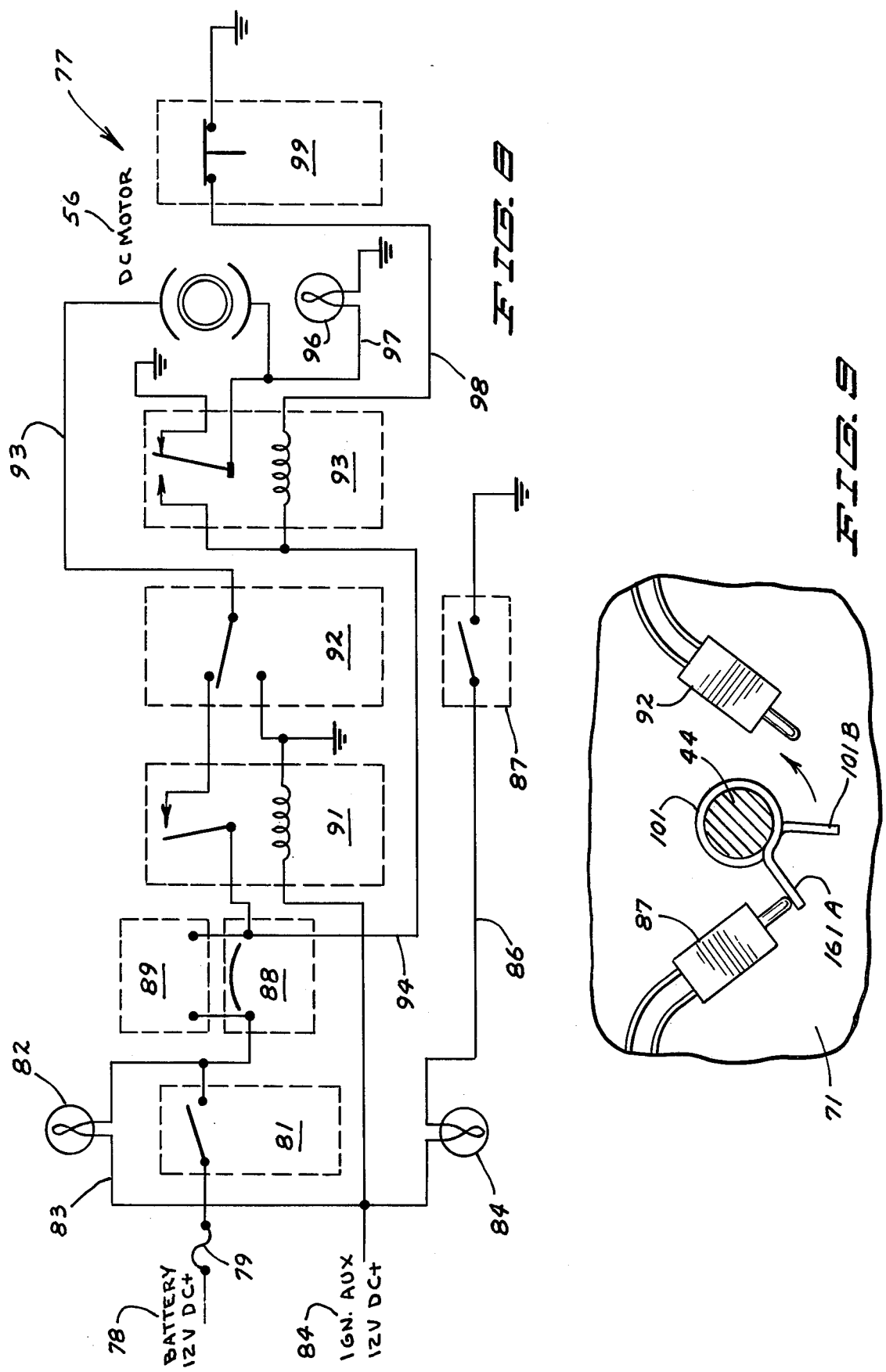

1

STEP ASSEMBLY FOR VEHICLE

BACKGROUND OF INVENTION

Recreational vehicles having entrance and exit doors are provided with self-storing steps adjacent the doorway. The steps include a transverse step and guide structures which permit the step to move to an out step position and retract to a storage position under the body of the vehicle. Manual slide and lock structures have been used to hold the steps in both the out position and the in storage position. The steps must be moved to the storage position when the vehicle is moved since the step projects outwardly from the side of the vehicle.

PRIOR ART

U.S. Pat. No. 760,195:Elkins
U.S. Pat. No. 1,982,748:Lamonica et al.
U.S. Pat. No. 2,797,104:Drobney et al.
U.S. Pat. No. 3,095,216:Browne et al.
U.S. Pat. No. 3,403,926:Way et al.
U.S. Pat. No. 3,762,742:Bucklen
U.S. Pat. No. 3,771,815:Bridges
U.S. Pat. No. 3,887,217:Thomas
U.S. Pat. No. 3,020,920:Abbott

SUMMARY OF INVENTION

The invention is directed to a step assembly for a vehicle to provide an auxiliary step adjacent the doorway of the vehicle. The step assembly has a frame adapted to be secured to the support structure of the vehicle. A step unit is linked to the frame with two pairs of parallel links. The forward link of each pair of links is pivotally connected at its opposite ends to the frame and the step unit. The rear links of the pairs of links are secured at their upper ends to a transverse control rod pivotally mounted on the frame. The lower ends of these links are pivotally connected to the step unit. A power unit having a reversible electric motor and a lead screw carrying a control nut is used to rotate the rod. Crank arm means connects the rod with the nut so that linear movement of the nut along the lead screw rotates the rod. Rotation of the rod moves the step unit between its out step position and its retracted stored or travel position.

An object of the invention is to provide a step assembly that can be readily attached to the support structure of a vehicle below the doorway of the vehicle. Another object of the invention is to provide a step unit that is movable from an out step position to an in storage position, and vice versa, in response to operation of a reversible power unit. A further object of the invention is to provide a step assembly with a reversible power unit that controls a transverse control rod secured to support links pivoted to a step assembly. A further object of the invention is to provide a step assembly that is durable and versatile in use, low cost in construction, and can be installed on a vehicle with a minimum of time and labor. These and other objects and advantages of the step assembly of this invention are set forth in the drawings and following detailed description.

IN THE DRAWINGS

FIG. 3 is a side elevational view similar to FIG. 2 showing the step in the in storage position;

FIG. 4 is a top plan view of FIG. 2 with portions broken away to show the pivots for the links of the step assembly;

FIG. 5 is a front elevational view of FIG. 2;

FIG. 6 is a sectional view taken along the line 6—6 of FIG. 2;

FIG. 7 is a rear elevational view of FIG. 2.

FIG. 8 is the electrical diagram of the electric control circuit for the step assembly; and FIG. 9 is an enlarged sectional view taken along line 9—9 of FIG. 4.

DESCRIPTION OF PREFERRED EMBODIMENT

Figure 1:
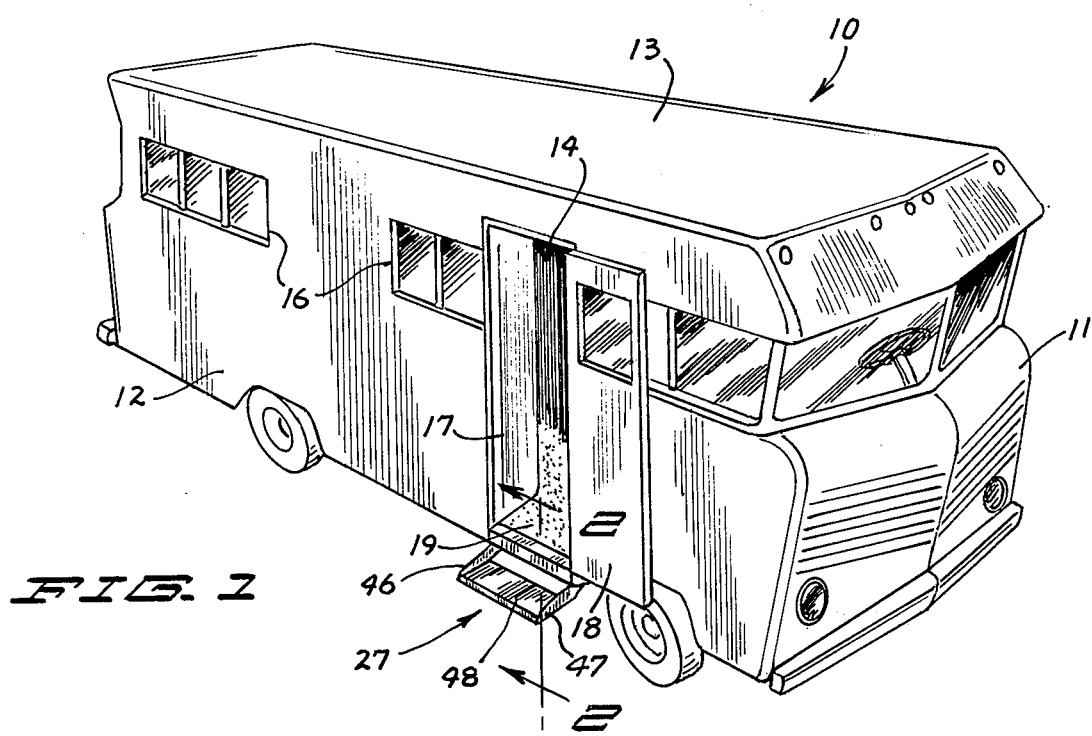
FIG. 1 is a perspective view of a motor home equipped with the step assembly of the invention.

Referring to FIG. 1, there is shown a vehicle indicated generally at 10. Vehicle 10 is shown as a motor home. An example of a motor home is shown in U.S. Pat. No. Des. 210,012. Vehicle 10 can be other types of vehicles, such as travel trailers, fifth-wheel trailers, campers, mobile offices, and the like.

Vehicle 10 has a box-shaped body having a front 11, upright sides 12 connected to a generally horizontal flat roof 13. The structure surrounds a room or space 14 comprising living and driver's compartments. Side wall 12 has a plurality of windows 16 and an upright doorway 17. A door 18 hinged to side wall 12 is operable to close doorway 17. The bottom of doorway 17 is open to a door well 19 providing access to the interior of the vehicle.

Figure 2:
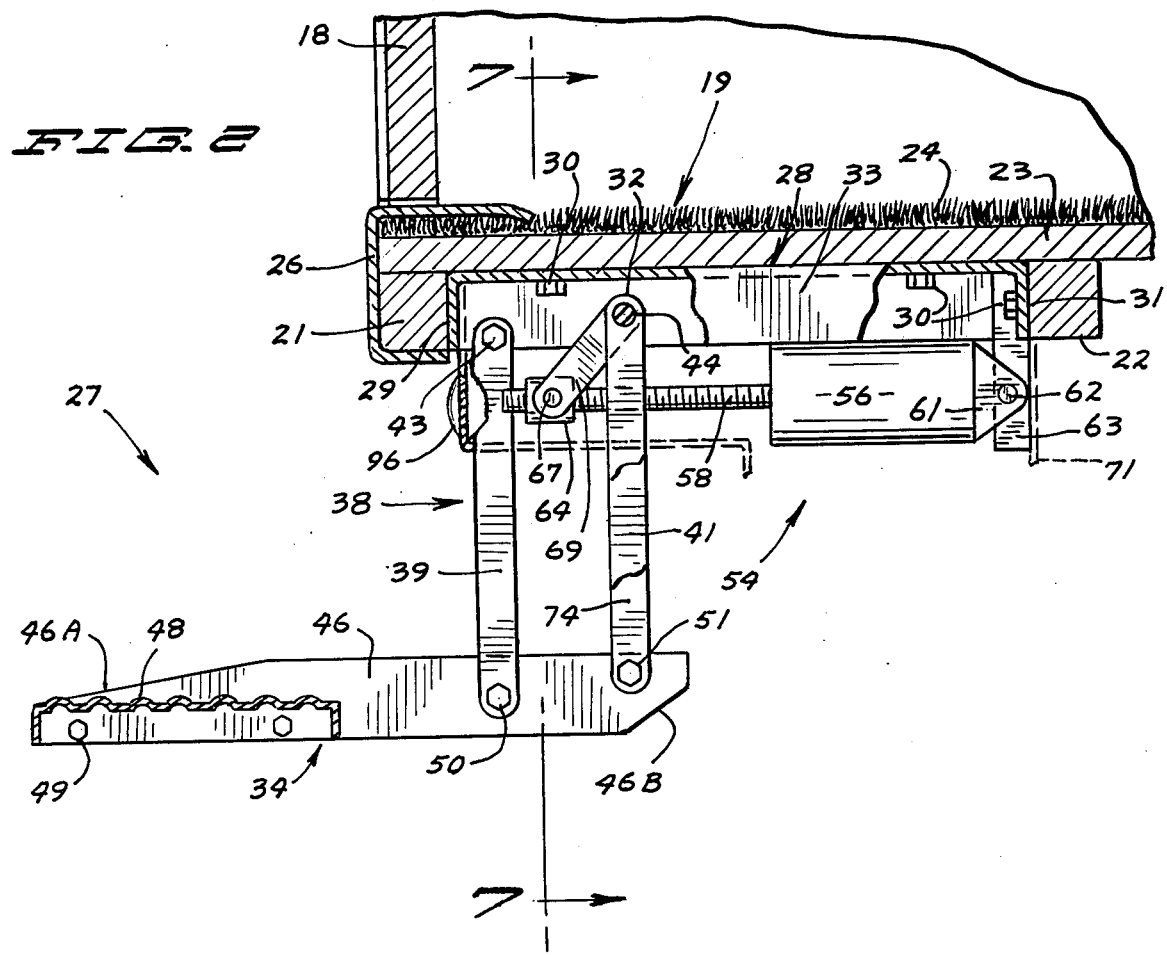
FIG. 2 is a side elevational view of the step assembly mounted on the support beams of a motor home with the step in the out position.

Referring to FIG. 2, vehicle 10 has a pair of support beams 21 and 22 carrying the floor boards 23. Floor boards 23 are covered with a carpet 24. A generally U-shaped sill 26 is located around carpet 24, floor boards 23, and beam 21 to protect the outside edges of the carpet 24, floor boards 23, and beam 21. Sill 26 can be an extruded metal member, such as aluminum.

A step assembly indicated generally at 27 is mounted on beams 21 and 22. As shown in FIG. 2, step assembly 27 is in its out or extended position wherein it provides a step intermediate between door well 19 and the ground. Referring to FIG. 3, the step assembly is in its up or retracted position under door well 19. A plurality of bolts 30 fasten a box frame 28 to beams 21 and 22 and floor boards 23. Frame 28 has a rectangular box shape and comprises a right angle front member 29 attached to right angle side members 32 and 33 and a right angle rear member 31. Frame 28 can be made from a single plate or sheet metal that is cut and bent into a box-like shape. The side flanges 29, 31, top walls 32, 33 and the side walls of housing 71 are all formed from a single piece of sheet metal.

A movable step unit indicated generally at 34 is connected to frame 28 with a first pair of arms or parallel links 35 and a second pair of arms or parallel links 38. As shown in FIG. 2, the second pair of links comprises a first downwardly directed link bar 39 and a second downwardly directed link bar 41. The first pair of links comprises a first downwardly directed link bar 36 and a second downwardly directed link bar 37. Link bars 36, 37, 39 and 41 are flat bars having substantially equal lengths. The upper end of link bar 36 is connected with a pivot bolt 42 to the forward portion of side member 32. In a similar manner, pivot bolt 43 connects the upper end of link bar 39 to the forward end of side frame member 33. Pivot bolts 42 and 43 are located along a common transverse axis so that link bars 36 and 39 have the same arcuate movement.

As shown in FIG. 4, a control rod 44 extends between side members 32 and 33. The upper ends of link bars 37 and 41 are secured by welds or the like to opposite ends of rod 44. Rod 44 has outwardly directed opposite ends 44A and 44B projected through bearings 45 located in holes in side members 32 and 33, respectively, to rotatably mount rod 44 on side members 32 and 33.

As shown in FIG. 5, the outer end 44A of rod 44 is located in a bearig 45. The opposite end of rod 44 is located in a similar bearing. Bearing 45 is of a grommet type construction having a head 45A bearing against one side of member 32. A cylindrical body projects through the hole in member 32. An annular ring-shaped washer 45B is clamped to the end of the body in engagement with the inside of member 32. The body has a cylindrical bearing surface 45C engageable with end 44A of rod 44. The washer serves as a spacer separating bar 37 from member 32. Body 44 provides the elongated bearing surface 45C for the end 44A of rod 44 thereby minimizing wear and shearing forces on the end of rod 44. Bearings similar to bearing 45 rotatably mount bolts 42 and 43 on frame 28. Other types of pivotal connections can be used to attach the upper ends of arms 37 and 41 to side members 32 and 33, respectively. As shown in FIGS. 2 and 3, rod 44 is located rearwardly and is above the pivot bolts 42 and 43. In other words, the pivot axis of rod 44 is at a higher elevation than the pivot axis of bolts 42 and 43.

Step unit 34 has a pair of horizontal side members 46 and 47 and a transverse step or horizontal platform 48. Platform 48 is located between the forward ends of side members 46 and 47 and is secured thereto by rivets, nut and bolt assemblies, or the like. Platform 48 has a generally flat top surface that is provided with a series of upwardly directed projections or dimples to enhance the gripping or non-slip characteristics of the top of platform 48. Other non-slip surfaces can be attached to the top of platform 48. The forward upper edges 46A and 47A of members 46 and 47 are beveled or inclined to eliminate sharp corners. The inner edges 46B and 47B of members 46 and 47 are also beveled.

The lower end of link bar 39 is connected with a pivot member such as a nut and bolt assembly 49 to an intermediate portion of member 46. The second arm 41 has a lower end connected to the rear end of member 46 with a pivot member 51. Link bars 36 and 37 have lower ends that are connected with pivot members 52 and 53 to member 46. Pivot members 49 and 52 are in transverse alignment.

Step unit 34 is moved from its out step position as shown in FIG. 2 to the in storage position, or travel position, as shown in FIG. 3, with a power unit indicated generally at 54. Power unit 54 comprises a reversible electric motor 56 connected to a power line 57. Power unit 54 can be a reversible hydraulic or pneumatic motor driving a lead screw. Motor 56 drives a lead screw 58. As shown in FIGS. 2 and 4, lead screw 58 extends in a forward longitudinal direction from motor 56. The rear end of motor 56 has a pair of downwardly directed ears 59 and 61. A transverse pivot pin 62 connects ears 59 and 61 to a downwardly directed bar 63. The upper end of bar 63 is secured by welds or the like to the midsection of rear frame member 31. A nut or threaded sleeve 64 is threaded on lead screw 58. A pair of laterally directed pins 66 and 67 are secured to opposite sides of the nut 64. Pins 66 and 67 are pivotally connected to the lower ends of crank arms 68 and 69.

The upper ends of crank arms 68 and 69 are secured by welds or the like to the midsection of rod 44.

The power unit 65 is enclosed within a housing or shield 71. Shield 71 is a box-shaped structure that is connected with bolts or fasteners 72 to floor boards 23. A pair of diagonal braces 73 and 74 have upper ends connected to rod 44. The lower ends of braces 73 and 74 are connected with pivot members 51 and 52.

Referring to FIG. 8, the electrical control circuit for operating step assembly 27 is indicated generally at 77. Circuit 77 is connected to vehicle battery 78 via a line having a fuse 79. An OFF/ON switch 81 is mounted on the vehicle dash. Switch 81 is a single pole-single throw switch.

A first light 82 is mounted on the dash to provide a warning that the power to the step assembly is off. Line 83 connects light 82 to switch 81 and the ignition switch 84 or line connected to the ignition switch. A second light 84 on the dash is connected with line 86 to switch 84 and ground via switch 87. Switch 87 is normally open.

Switch 81 is connected to a circuit breaker 88. A trouble warning buzzer 89 is connected to circuit breaker 88. When circuit breaker 88 is open, the buzzer is actuated providing an audible signal.

A normally open relay 91 is connected to circuit breaker 88 and switch 84. When switch 84 is turned ON relay 91 is energized closing its single contact. Relay 91 is connected to a single pole douuble throw switch 92. Line 93 connects switch 92 with DC motor 56.

A second relay 93 is connected with line 94 to circuit breaker 88. Relay 93 is a single pole double throw switch that normally connects motor 56 to ground. A courtsy light 96 is connected with line 97 to relay 93. As shown in FIG. 2, light 96 is mounted on the front of housing 71 so that its function is to light the step or platform 48. A line 98 connects relay 93 to a door switch 99. Switch 99 is normally closed. When the door 18 is closed the switch 99 is open.

As shown in FIG. 9, a spring band 101 is clamped around rod 44. Band 101 has a pair of ears 101A and 101B that engage the actuators of switches 87 and 92. Ear 101A contacts out limit switch 87 which turns motor 56 off when step unit 34 is in its out position. Ear 101B contacts in limit switch 92 which turns motor 56 off when the step unit 34 is in its retracted position.

Circuit 77, shown in FIG. 8, is illustrated as operable when the door 18 is open, the motor is off, light 96 is off, and step assembly 27 is in the IN position. When door switch 99 is closed by closing the door, relay 93 moves to the off position thereby turning light 96 off. Step assembly 27 remains in the out position.

When ignition 84 is turned on, and the door is closed, motor 56 operates to retract step assembly 27 and turn light 96 off. Motor 56 is operated until the retracted limit switch 92 is actuated, thereby terminating the power to the motor. With motor 56 on and door 18 open, the step assembly 27 will move to its out position as shown in FIG. 1. Motor 56 will operate until the stepout limit switch is actuated, thereby terminating the power to motor 56. Light 96 will be in the on position as switch 99 will be closed.

In use, motor 56 is energize when door 18 is open. The motor drives screw 58 in a first or clockwise direction, moving nut 64 to the outer end of screw 58. Screw 58 through crank arms 68 and 69 rotate shaft 44. Since arms 37 and 41 are fixed to shaft 44, step unit 34 moves in a downward horizontal direction until it is in the full out position as shown in FIG. 2. Forward arms 36 and 39 are parallel links to rear arms 37 and 41 and thereby keep step 48 in a horizontal position. When step 48 is in its full out position, out limit switch is actuated and motor 56 is deenergized.

When door 18 is closed and vehicle 10 is ready for road use, step unit 34 should be retracted back up under door well 19 since it projects outwardly from side 12 of the vehicle. Motor 56 is energized rotating screw 58 in an opposite or second direction. This moves nut 64 from the outer end of the screw 58 to the inner end of the screw 58, as shown in FIG. 3. Crank arms 68 and 69 are moved in a counter-clockwise direction to rotate rod 44 and thereby move step assembly 34 up and back to the storage position under frame 28. When step unit 34 is in the full retracted position, in limit switch 92 is actuated and motor 56 is deenergized.

While there is shown and described one embodiment of the step assembly, it is understood that changes in materials, parts, and size of the structure can be made without departing from the invention.

The embodiments of the invention in which an exclusive property or privilege is claimed are defined as follows:

1. A step assembly for a vehicle having a doorway and support beams below the doorway comprising: a frame having a pair of parallel side members and a rear member secured to the side members, said frame adapted to be secured to the support beams below the doorway of the vehicle, a step unit selectively movable between an out step position below and outwardly of the doorway and an in storage position below the frame, first and second pairs of links pivotally connecting the step unit to the frame, each link having an upper end and a lower end, first pivot means connecting the upper end of one link of the first pair of links to one side member, a second pivot means connecting the upper end of one link of the second pair of links to the other side member, a transverse rod nonrotatably secured to the upper ends of the other links of the first and second pairs of links, said rod having opposite ends rotatably mounted on the side members; said step unit having a pair of horizontal side members, and a transverse horizontal platform secured to said side members; pivot means pivotally connecting the lower ends of the first pair of links to one side member and pivotally connecting the lower ends of the second pair of links to the other side member, a power unit pivotally connected to the rear member of the frame, said power unit having a reversible electric motor, a lead screw drivably connected to the motor, a nut threaded on the screw, crank means secured to the rod, and means pivotally connecting the nut to the crank means whereby when said motor is operated in a first direction of screw rotates to move the nut so that the crank means rotates the rod thereby moving the step unit from an out step position to an in storage position and when said motor is operated in a second direction the screw moves the nut to rotate the rod in an opposite direction to move the step from the storage position to the out step position.

2. The step assembly of claim 1 including: a bar secured to the midsection of the rear frame member and extended downwardly therefrom, ear means secured to the motor, and transverse pin means connecting the ear means to the bar.

3. The step assembly of claim 1 wherein: all of the links have substantially the same length.

4. The step assembly of claim 1 including: a pair of downwardly directed braces pivotally secured to the rod and pivotally connected to the side members of the step unit.

5. The step assembly of claim 1 wherein: the crank means includes a pair of downwardly directed crank arms secured to the midsection of the rod, said nut having outwardly directed projections pivotally mounted in the lower ends of said crank arms.

6. The step assembly of claim 1 wherein: the other links of the first and second pair of links are located rearwardly of the one link of the first and second pair of links.

7. The step assembly of claim 1 wherein: the pivot axis of said rod is located rearwardly and above the pivot axis of the first and second pivot means.

8. The step assembly of claim 1 wherein: the frame is a box structure having a transverse front member secured to the side members.

9. The step assembly of claim 1 including: bearings rotatably mounting the opposite ends of the rod on the side members.

10. The step assembly of claim 9 wherein: each bearing has a tubular body accommodating an end of the rod, and a washer mounted on the body to hold the body on the side member and space a link from the side member.

11. The step assembly of claim including: control circuit means for controlling the reversible electric motor, said circuit means having a first limit switch operable to turn the motor off when the step unit is in the out step position and a second limit switch operable to turn the motor off when the step unit is in the storage position.

12. A step assembly for a vehicle having a doorway and support beams below the doorway comprising: a frame having side members and a rear member secured to the side members, said frame adapted to be secured to the support beams below the doorway of the vehicle, a step unit selectively movable between an out step position below and outwardly of the doorway and an in storage position below the frame, link means pivotally connecting the step unit to the frame said link means including two pairs of links each link having an upper end and a lower end, first pivot means connecting the upper end of one link of one pair of links to one side member, a second pivot means connecting the upper end of one link of the other pair of links to the other side membr, a transverse rod non-rotatably secured to the upper ends of the other links of the two pairs of links, means mounting the ends of the rods on the side members, said step unit having a pair of horizontal side members, pivot means pivotally connecting the lower ends of one pair of links to one side member and pivotally connecting the lower ends of the other pair of links to the other side member, a power unit pivotally connected to the rear member of the frame, said power unit having a reversible drive unit, a lead screw drivably connected to the drive unit, a nut threaded on the screw, crank means secured to the rod, and means pivotally connecting the nut to the crank means whereby when said drive unit is operated in a first direction the screw rotates to move the nut so that the crank means rotate the rod thereby moving the step unit from an out step position to an in storage position and when said drive unit is operated in a second direction the screw moves the nut to rotate the rod in an opposite direction to move the step from the storage position to the out step position.

13. The step assembly claim 12 wherein: said frame is a box structure having a transverse front member secured to the side members, said side members being parallel to each other.

14. The step assembly of claim 12 including: a bar secured to the midsection of the rear frame member and extended downwardly therefrom, ear means secured to the drive unit, and transverse pivot means connecting the ear means to the bar.

15. The step assembly of claim 12 wherein: all of the links have substantially the same length.

16. The step assembly of claim 12 including a housing enclosing the power unit.

17. The step assembly of claim 12 including: a pair of downwardly directed braces secured to said rod and pivotally connected to the side members of the step unit.

18. The step assembly of claim 12 wherein: the crank means includes a pair of downwardly directed crank arms secured to the midsection of the rod, said nut having outwardly directed projections pivotally mounted on the lower ends of said crank arms.

19. The step assembly of claim 12 wherein: said drive unit is a reversible electric motor drivably connected to the lead screw.

20. The step assembly of claim 12 wherein: the means mounting the ends of the rods on the side membeers comprise bearings mounted on the side members.

21. The step assembly of claim 20 wherein: each bearing has a tubular body accommodating an end of the rod, and a washer mounted on the body to hold the body on the side membr and space one link of the other pair of links from the side member.

22. The step assembly of claim 12 including: control meeans for controlling the reversible drive unit, said control means having first means operable to stop the drive unit when the step unit is in the out step position and second means operable to stop the drive unit when the step unit is in the in retracted position.

23. A step assembly for a vehicle having a doorway and support means below the doorway comprising: a frame adapted to be secured to the support means below the doorway, a step unit selectively movable between an out step position below and outwardly of the doorway and an in storage position below the frame, link means pivotally connecting the step unit to the frame, a transverse rod secured to the link means whereby the rod and link means rotate together, means rotatably mounting opposite ends of the rod on the frame, a power unit connected to the frame, said power unit having a reversible drive unit, a lead screw, a threaded member on the lead screw, crank means secured to the rod, and means connecting the threaded member to the crank means whereby when said drive unit is operated in a first direction the screw rotates to move the threaded member so that the crank means rotate the rod thereby moving the step unit from an out step position to an in storage position and when said drive unit is operated in a second direction the screw moves the threaded member to rotate the rod in an opposite direction to move the step from the storage position to the out step position.

24. The step assembly of claim 23 including: a bar secured to the midsection of the rear frame member and extended downwardly therefom, ear means secured to the drive unit, and transverse pivot means connecting the ear means to the bar.

25. The step assembly of claim 23 including: a pair of downwardly directed braces secured to the rod and pivotally connected to the step unit.

26. The step assembly of claim 23 wherein: the crank means includes a pair of downwardly directed crank arms secured to the midsection of the rod, said threaded member nut having outwardly directed projections pivotally mounted on the lower ends of said crank arms.

27. The step assembly of claim 23 wherein: the means mounting opposite ends of the rod on the frame comprises bearings mounted on separate portions of the frame.

28. The step assembly of claim 27 wherein: each bearing has a tubular body accommodating an end of the rod, and a washer mounted on the body to hold the body on the frame and space a portion of the link means from the frame.

29. The step assembly of claim 23 including: control means for controlling the reversible drive unit, said control means having first means operable to stop the drive unit when the step unit is in the out step position and second means operable to stop the drive unit when the step unit is in the in retracted position.

* * * * *

UNITED STATES PATENT AND TRADEMARK OFFICE
CERTIFICATE OF CORRECTION

PATENT NO. : 4,116,457
DATED : September 26, 1978
INVENTOR(S) : Marvin E. Nerem, et al.

It is certified that error appears in the above-identified patent and that said Letters Patent are hereby corrected as shown below:

Column 1, line 25, "3" should be -- 4 --.

Column 3, line 10, "bearig" should be -- bearing --.

Column 4, line 3, "65" should be -- 54 --.

Column 4, line 29, "douuble" should be -- double --.

Column 4, line 34, "courtsy" should be -- courtesy --.

Column 4, line 63, "energize" should be -- energized --.

Column 6, line 29, after "claim" insert -- 1 --.

Column 6, line 50, "membr" should be -- member --.

Column 7, line 29, "membeers" should be -- members --.

Column 7, line 34, "membr" should be -- member --.

Column 7, line 37, "meeans" should be -- means --.

Signed and Sealed this

Nineteenth Day of December 1978

[SEAL]

Attest:

RUTH C. MASON
Attesting Officer

DONALD W. BANNER
Commissioner of Patents and Trademarks